United States Patent [19]

Soules et al.

[11] Patent Number: 5,731,659
[45] Date of Patent: Mar. 24, 1998

[54] FLUORESCENT LAMP WITH PHOSPHOR COATING OF MULTIPLE LAYERS

[75] Inventors: Thomas F. Soules, Richmond Heights, Ohio; Pamela K. Whitman, Livermore, Calif.; Daniel R. Chirayath, University Heights, Ohio

[73] Assignee: General Electric Company, Schenectady, N.Y.

[21] Appl. No.: 644,441

[22] Filed: May 13, 1996

[51] Int. Cl.$^6$ .................................................. H01J 1/68
[52] U.S. Cl. .................. 313/487; 313/493; 313/485; 313/486
[58] Field of Search ........................ 313/485, 486, 313/487, 493

[56] References Cited

U.S. PATENT DOCUMENTS

| | | |
|---|---|---|
| 3,707,642 | 12/1972 | Thornton, Jr. . |
| 4,069,441 | 1/1978 | Wanmaker et al. . |
| 4,088,923 | 5/1978 | Manders . |
| 4,363,998 | 12/1982 | Graff et al. ............................ 313/487 |
| 4,393,330 | 7/1983 | Skwirut et al. ...................... 313/487 |
| 4,623,816 | 11/1986 | Hoffman et al. . |
| 4,705,986 | 11/1987 | Iwama et al. . |
| 4,847,533 | 7/1989 | Hoffman . |
| 5,045,752 | 9/1991 | Jansma . |
| 5,258,689 | 11/1993 | Jansma et al. . |

FOREIGN PATENT DOCUMENTS

| | | |
|---|---|---|
| 0042126 A | 12/1981 | European Pat. Off. . |
| 0077402 A | 4/1983 | European Pat. Off. . |
| 0540788 A | 5/1993 | European Pat. Off. . |

Primary Examiner—Nimeshkumar Patel
Attorney, Agent, or Firm—George E. Hawranko

[57] ABSTRACT

A low pressure mercury vapor discharge lamp is provided, having a non-straight glass envelope and a plurality of rare earth phosphor layers coated inside the glass envelope. The lamp is made by coating a plurality of rare earth phosphor layers inside a straight glass tube. The tube is then formed into a non-straight configuration, each layer being sufficiently thin so that the phosphor coating does not flake off in sections where the tube is bent around a radius of curvature. A plurality of thin rare earth phosphor layers will not flake off in the bent section whereas a single thick rare earth phosphor layer will flake off. The invention is particularly useful in the manufacture of helical compact fluorescent lamps.

17 Claims, 2 Drawing Sheets

FLUORESCENT LAMP WITH PHOSPHOR COATING OF MULTIPLE LAYERS

BACKGROUND OF THE INVENTION

1. Field of the Invention

The present invention relates generally to fluorescent lamps and more particularly to a low pressure mercury vapor discharge fluorescent lamp having a rare earth phosphor coating of multiple layers.

2. Description of Related Art

With regard to low pressure mercury vapor fluorescent lamps, it is known to use straight or cylindrical glass tubes and bent or non-straight glass tubes in the final lamp configuration. An example of the latter is a compact fluorescent lamp made with cylindrical straight tubing which is bent in manufacturing. With respect to lamps with non-straight tubes or glass envelopes, such lamps can be coated with phosphor before or after forming or bending of the glass tubing. If the forming is completed before the phosphor is coated on the inner surface of the tubing via a suspension, the suspension may not drain completely. In some configurations phosphor will settle preferentially to the bottom of a bend during draining. Even when drained by being rotated or shaken or otherwise moved in a complex fashion or by applying air pressure, the coating is often very non-uniform.

One solution to this problem is to first complete the coating of the phosphor on the straight tubing and then form the tubing to its final lamp configuration. However, this has been done with relatively thick single layers or coatings of phosphor (the single layer being of sufficient thickness to absorb substantially all the UV generated by the arc), but this single layer of phosphor tends to flake or partially come off in sections where the tube is formed or bent around a radius of curvature. What is needed is a procedure or approach which will result in the phosphor coating adhering better and not flaking or coming off in sections where the tube is bent or formed, during the forming procedure.

SUMMARY OF THE INVENTION

A low pressure mercury vapor discharge lamp is provided. The lamp includes a non-straight glass envelope, means for providing a discharge, and a discharge-sustaining fill of mercury and an inert gas sealed inside said envelope. A plurality of rare earth phosphor layers are coated inside the glass envelope. A method of making the invented low pressure mercury vapor discharge lamp is also provided.

DETAILED DESCRIPTION OF THE PREFERRED EMBODIMENTS OF THE INVENTION

As used in the specification and claims, "formed", "form", or "forming", with respect to glass envelopes or glass tubing, means bending or reshaping such as by heating the glass tube to its softening point and bending or reshaping it and then letting it cool in its new shape or configuration; "coating weight" is determined or calculated after lamp-making is completed; and "non-straight glass envelope" includes (but is not limited to) a glass envelope or tube which is in the shape of an L or a U (such as a 4 foot T8 or T12 lamp bent into a U-shape), a circular glass envelope as is known in the art, the glass envelope of a compact fluorescent lamp, particularly a helical compact fluorescent lamp, and other glass envelopes which are not a straight cylindrical glass envelope. Compact fluorescent lamps are well known; see U.S. Pat. Nos. 2,279,635; 3,764,844; 3,899,712; 4,503,360; 5,128,590; 5,243,256; U.S. patent application Ser. No. 08/414,077 filed Mar. 31, 1995; and German Patent Application No. DE 4133077 filed in Germany on Oct. 2, 1991; the contents of the above-described U.S. references are hereby incorporated by reference.

Figure 1:
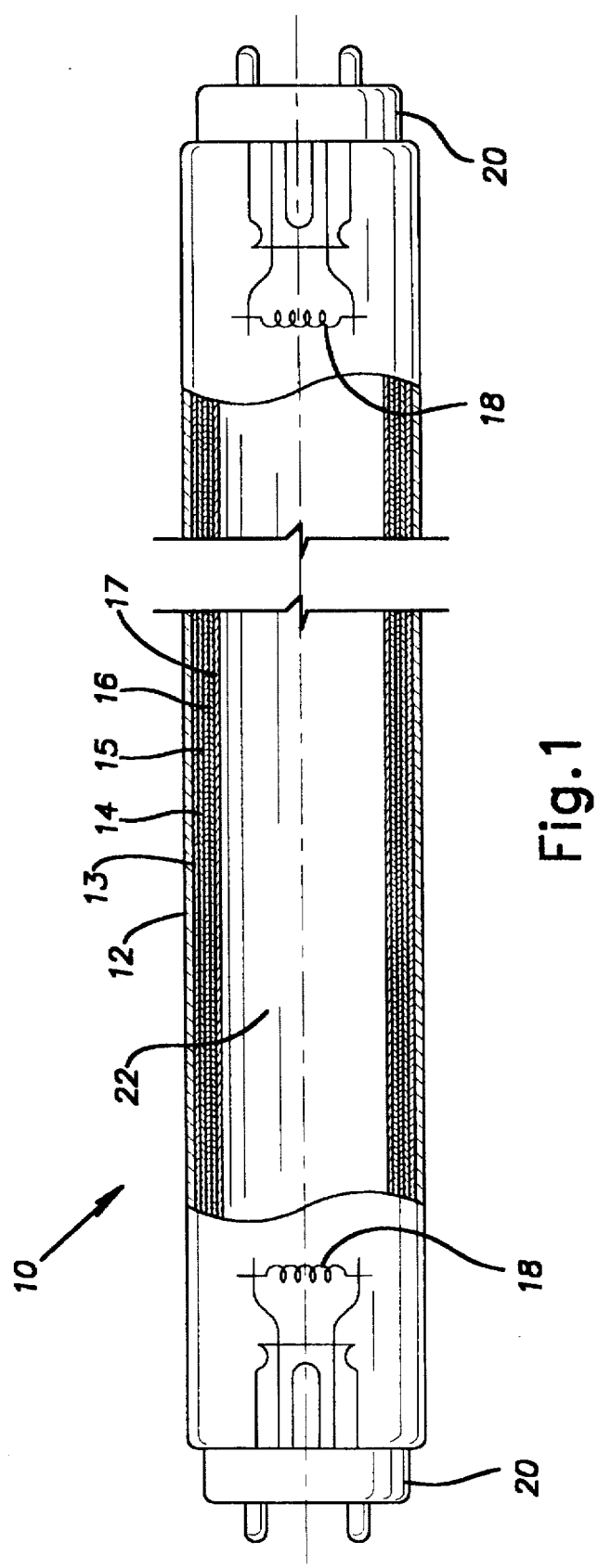
FIG. 1 shows diagrammatically, broken, and partially in section, a glass envelope or tube of a low pressure mercury vapor discharge fluorescent lamp according to the present invention.

FIG. 1 shows diagrammatically a representative glass envelope or tube of a low pressure mercury vapor discharge fluorescent lamp 10. The broken lines indicate that a section is omitted; in the present invention a non-straight or bent portion would be where the omitted portion is located. The fluorescent lamp 10 has a light-transmissive glass envelope or tube 12 which preferably has a circular or oval cross section. Different envelopes frequently have different diameters. A compact fluorescent lamp typically has a 12 mm outer diameter; other common envelopes have diameters of 25 and 37 mm. The inner surface of the glass envelope or tube is provided with a plurality of rare earth phosphor layers, preferably 2–6, more preferably 2–5, more preferably 2–4, more preferably 2–3, more preferably 2 or 3, layers. In FIG. 1, rare earth phosphor layers 13, 14, 15, 16 and 17 are shown for purposes of illustration, although more or less can be provided, but at least 2. As is known in the art, other coatings such as conductive coatings, precoats, barrier layers, and ultraviolet reflecting layers may be provided between the phosphor layers and the inner surface of the glass tube.

The lamp is hermetically sealed by bases 20 attached at both ends (as is known in the art, other types of bases 20 may be used in the lamps of the present invention). A pair of spaced electrode structures 18 (which are means for providing a discharge) are respectively mounted on the bases. A discharge-sustaining fill 22 of mercury and an inert gas is sealed inside the glass envelope. The inert gas is typically argon or a mixture of argon and other noble gases at low pressure which, in combination with a small quantity of mercury, provides the low vapor pressure manner of operation.

The present invention may be used in fluorescent lamps having electrodes as is known in the art, as well as in electrodeless fluorescent lamps as are known in the art, where the means for providing a discharge is a structure which provides high-frequency electromagnetic energy or radiation.

Each rare earth phosphor layer contains a rare earth phosphor system (which is typically a blend of rare earth phosphors), and does not contain halophosphate phosphors. The lamps of the present invention do not contain halophosphate phosphor layers. Rare earth phosphor systems are well-known in the art. As used in the specification and claims herein, a rare earth phosphor system includes (1) a triphosphor system such as a red, blue and green color-emitting phosphor blend as disclosed in U.S. Pat. Nos. 5,045,752; 4,088,923; 4,335,330; 4,847,533; 4,806,824; 3,937,998; and 4,431,941; and (2) phosphor blends which have other numbers of rare earth phosphors, such as systems with four or five rare earth phosphors. Any rare earth phosphor system known in the art may be used. Each rare earth phosphor layer is a traditional rare earth phosphor layer as is known in the art, except that it is particularly thin. As with traditional rare earth phosphor layers, the phosphor layers of the present invention may contain non-luminescent particles such as alumina, calcium pyrophosphate, and certain borate compounds as are known in the art.

Each rare earth phosphor layer is applied in a thin coating in a manner known in the art, preferably to a piece of straight cylindrical tubing. In the coating procedure typically the rare earth phosphor particles or powders are blended by weight. The resulting powder is then dispersed in a water vehicle (which may contain other additives as are known in the art, such as adherence promoters such as fine non-luminescent particles of alumina or calcium pyrophosphate) with a dispersing agent as is known in the art. Then a thickener is added, typically polyethylene oxide. The suspension is then typically diluted with deionized water until it is suitable for producing a coating of the desired thickness or coating weight. The suspension is then applied as a coating to the inside of the glass tube (preferably by pouring the suspension down the inside of a vertically-held tube or pumping the suspension up into same) and heated by forced air until dry, as is known in the art. After the first thin coat or layer is applied, additional thin coats or layers are applied in the same manner, carefully drying each coat before the next coat is applied. Each thin coat or layer is of the same phosphor blend or composition; thus when a tube has received all of its thin coats, each coat will be of the same phosphor blend or composition. After the last coat has been applied, the binders and other organic ingredients are baked out, as is known in the art. Then the straight tube can be heated to its softening point and formed into the desired non-straight configuration, such as to make the glass envelope for a helical compact fluorescent lamp. By the use of the invention the phosphor coating will not flake off during forming in the sections being formed or bent.

Each rare earth phosphor layer is comprised of rare earth phosphor particles, as is known in the art; preferably rare earth triphosphor blends are used. The rare earth phosphor particles used in the invention have a median particle size or diameter of preferably 1.5–9 microns, more preferably 3–6 microns, more preferably about 4 microns, and have a particle density of preferably about 4–5.5 $g/cm^3$, more preferably about 5 $g/cm^3$. Each rare earth phosphor layer has a thickness, after lamp making, of 1–3, more preferably 1.5–2.5, more preferably about 2, particles thick. By this is meant, for example, if the median particle size is 4 microns and the phosphor layer has a thickness of 2 particles, then the layer is approximately 8 microns thick. As used herein, if the median particle size is 5 microns and the phosphor layer has a thickness of 3 particles, the layer is approximately 15 microns thick, etc. When particles form a layer, the particles are touching, to the extent permitted by packing.

If a typical rare earth triphosphor blend is used, having a 4 micron median particle size and a particle density of 5 $g/cm^3$, and a layer 2 particles thick is applied, the coating weight of that layer on the glass envelope is about 1.3 $mg/cm^2$ (if a theoretical porosity factor of 0.5 is used), and about 1.9 $mg/cm^2$ (if a theoretical porosity factor of 0.7 is used). The theoretical porosity factor accounts for the fact that there is empty space or interstitial space among or between the touching particles. For a rare earth triphosphor blend having a 4 micron median particle size and a particle density of 5 $g/cm^3$, the coating weight for each layer is 1–2, more preferably 1–1.8, more preferably 1.1–1.5, more preferably 1.2–1.3, $mg/cm^2$; for other median particle sizes, the preferred coating weights for each layer can be obtained by multiplying the above ranges by the ratio of the new median particle size to 4 microns; for other particle densities, the preferred coating weights for each layer can be obtained by multiplying the above ranges by the ratio of the new particle density to 5 $g/cm^3$. If both median particle size and particle density change, the new coating weight ranges are obtained by performing both calculations. As can be seen, the preferred coating weight is a function of the median particle size and the particle density.

In the present invention the thin layers are built up until the total or cumulative coating thickness is sufficient to absorb substantially all of the UV light produced by the arc; this is typically 4–8, preferably about 6, particles thick. Preferably there are 2–6, more preferably 2–5, more preferably 2–4, more preferably 2–3, more preferably 2 or 3, rare earth phosphor layers. If 3 layers, each about 2 particles thick, are applied, this will yield a cumulative coating thickness of about 6 particles thick. The cumulative coating thickness should be such that even when stretched around the outside of the sharpest bends it remains about 4–6 particles thick. If a triphosphor blend having a 4 micron median particle size and a particle density of 5 $g/cm^3$ is used, the total or cumulative coating weight is preferably at least 2.6 $mg/cm^2$, more preferably at least 3 $mg/cm^2$, more preferably at least 3.5 $mg/cm^2$; if other median particle sizes or particle densities are used, the preferred total or cumulative coating weights are directly proportional. If a triphosphor blend having a 4 micron median particle size and a particle density of 5 $g/cm^3$ is used, it is effective to apply 3 thin layers each having a coating weight of 1.2–1.3 $mg/cm^2$, yielding a total cumulative coating weight of 3.5–3.9 $mg/cm^2$.

The invention is particularly useful in preventing flaking or falling off in sections of straight tubing being bent around a radius of curvature to yield a bent portion having an inside radius of curvature of less than 65 cm, more preferably less than 30 cm, more preferably less than 15 cm, more preferably less than 7 cm, more preferably less than 3 cm, more preferably less than 15 mm, more preferably less than 7 mm, more preferably less than 3 mm, more preferably less than 1.5 mm, more preferably less than 1 mm.

It is believed that if the individual phosphor layer is 1–2 or 1–3 particles thick, it remains sufficiently flexible to bend. If it is 4–6 or more particles thick, it is too rigid. Particles in thin layers can rotate around each other when the layer is bent. The particles in each thin layer can follow the bend of the glass or the layer below and the layers themselves are separated from each other by virtue of having been coated and dried separately, and can slide slightly past each other during bending, thus avoiding flaking off.

Figure 2:
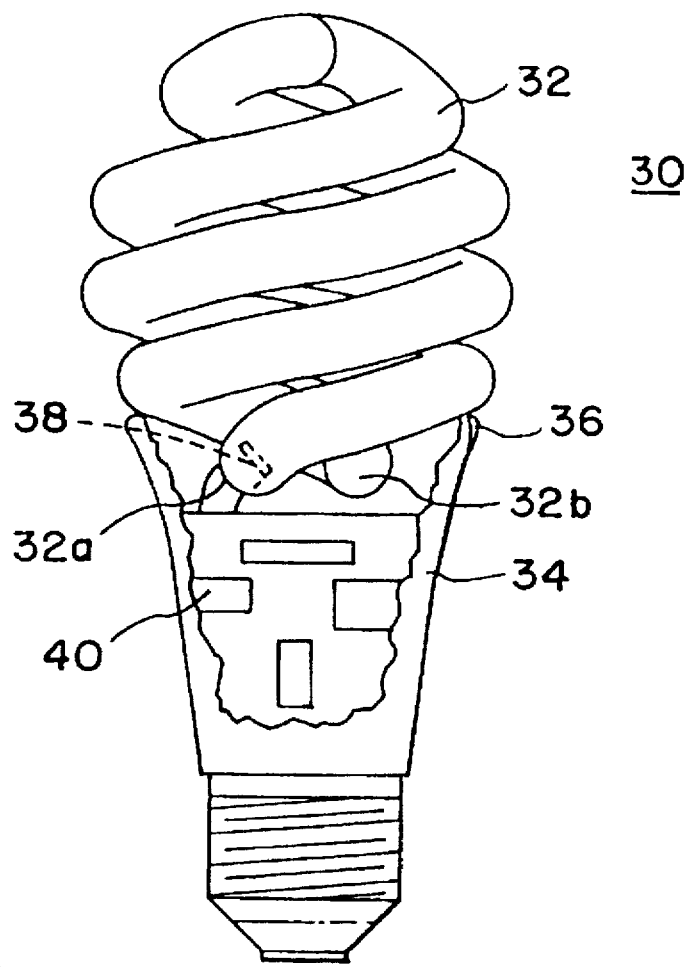
FIG. 2 shows an elevational view, with part of the housing broken away, of a helical compact fluorescent lamp for use with the invention.
Figure 3:
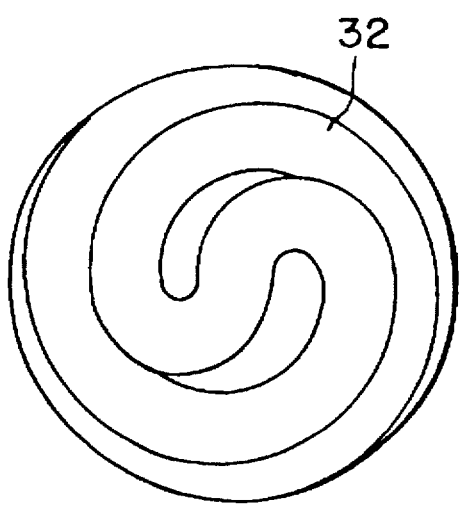
FIG. 3 shows a top view of the helical compact fluorescent lamp of FIG. 2.

The invention is particularly useful in the manufacture of compact fluorescent lamps, particularly helical compact fluorescent lamps, such as shown in FIGS. 2–3, where a lot of forming is required. With reference to FIGS. 2–3, a helical compact fluorescent lamp 30 is shown, having a lamp envelope or tube 32 in a coiled double helix configuration. End portions 32a, 32b enter the top portion 36 of the housing member 34; disposed within the end portions 32a, 32b are electrodes 38 which are electrically coupled to a ballast circuit arrangement 40 mounted within housing member 34.

The following Example further illustrates various aspects of the invention.

EXAMPLE

Straight tubes were coated or layered with a rare earth triphosphor blend having a 4 micron, median particle size and a 5 g/cm³ particle density; these tubes were then formed into a helical compact fluorescent lamp. Thin layers of 1.5–2.0 mg/cm² coating weight were applied. When tubes with 2, 3, 4, and even more thin layers were formed, little or no coating was observed to come off after helical coiling even in the region at the top of the lamp where the tubing is bent around a ⅛ inch radius of curvature. This occurred even when the total or cumulative phosphor coating weight was 5–6 mg/cm². If a single layer was used, significant coating flaked off the envelope or tube even at about 2.6 mg/cm³ coating weight, and it was not possible to go higher in coating weight without severe loss of phosphor over a large portion of the lamp in regions where the tubing was bent.

Although the preferred embodiments of the invention have been shown and described, it should be understood that various modifications and rearrangements may be resorted to without departing from the scope of the invention as disclosed and claimed herein.

What is claimed is:

1. A low pressure mercury vapor discharge lamp comprising a non-straight glass envelope, means for providing a discharge, a discharge-sustaining fill of mercury and an inert gas sealed inside said envelope, and a plurality of rare earth phosphor layers coated inside said glass envelope, each of said plurality of phosphor layers (1) being comprised of rare earth phosphor particles having a median particle size, and (2) being 1 to 3 particles thick, said plurality of layers consisting of 2 to 6 layers.

2. A lamp according to claim 1, each of said plurality of phosphor layers being of the same rare earth phosphor composition.

3. A lamp according to claim 2, each of said plurality of phosphor layers being 1 to 2 particles thick.

4. A lamp according to claim 2, each of said plurality of phosphor layers having a coating weight of 1 to 2 mg/cm².

5. A lamp according to claim 1, said plurality of layers consisting of 3 to 6 layers.

6. A lamp according to claim 1, said non-straight glass envelope having a bent portion having an inside radius of curvature of less than 15 cm.

7. A lamp according to claim 1, said glass envelope being the glass envelope of a compact fluorescent lamp.

8. A lamp according to claim 7, said compact fluorescent lamp being a helical compact fluorescent lamp.

9. A lamp according to claim 1, said median particle size being 1.5 to 9 microns.

10. A lamp according to claim 1, said median particle size being 3 to 6 microns.

11. A lamp according to claim 1, said median particle size being about 4 microns.

12. A lamp according to claim 1, each of said plurality of phosphor layers being 1.5 to 2.5 particles thick.

13. A lamp according to claim 1, said lamp having a total coating thickness of phosphor layers, said total coating thickness being 4 to 8 particles thick.

14. A lamp according to claim 13, said total coating thickness being about 6 particles thick.

15. A lamp according to claim 1, said plurality of layers consisting of 2 to 3 layers.

16. A lamp according to claim 1, said plurality of phosphor layers having a total coating weight of at least 3 mg/cm².

17. A lamp according to claim 6, said inside radius of curvature being less than 15 mm.

* * * * *